Figure 4:
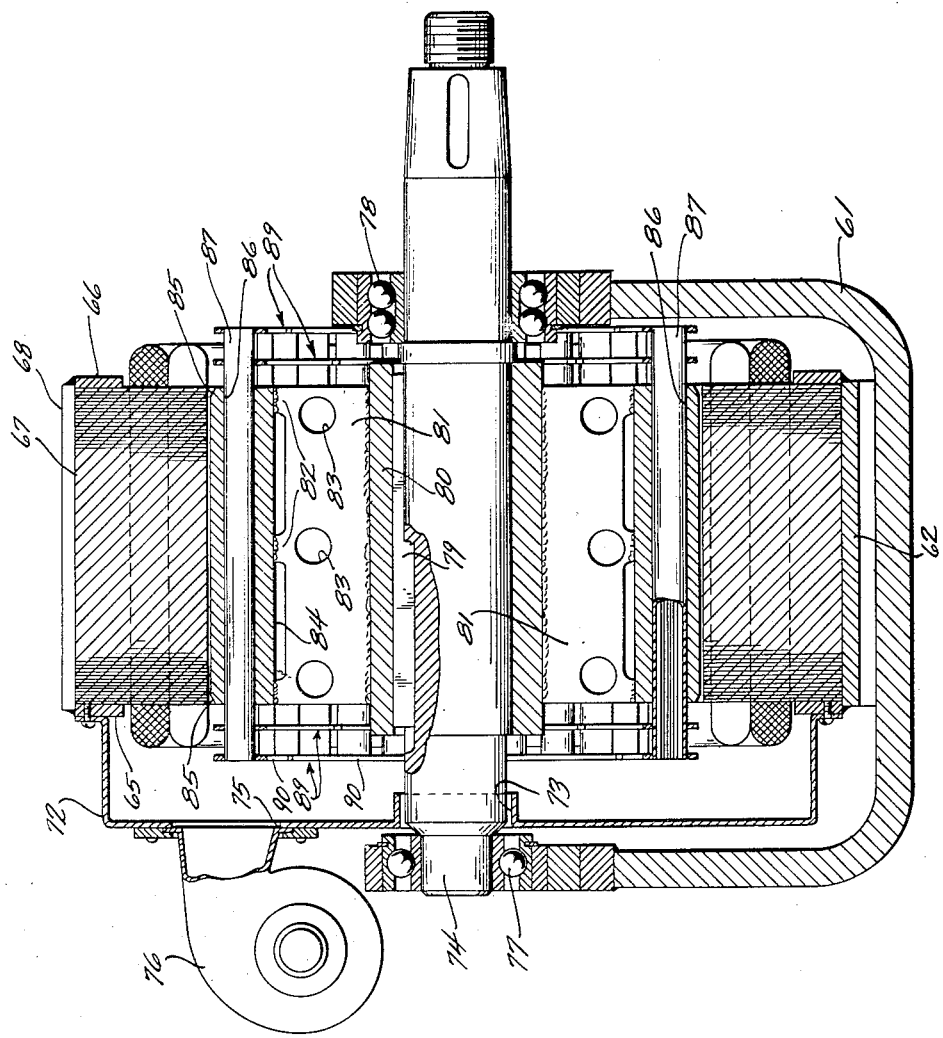

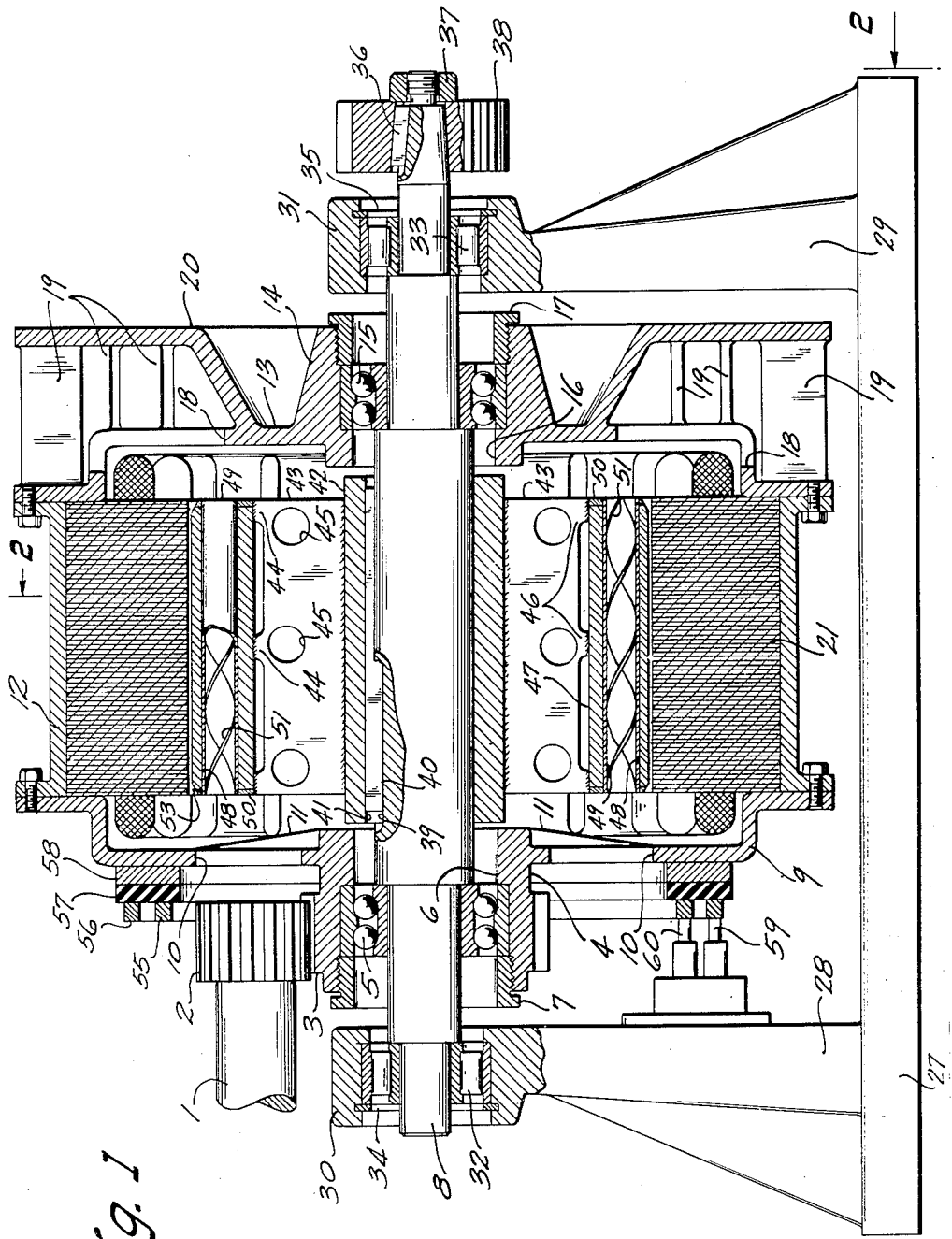

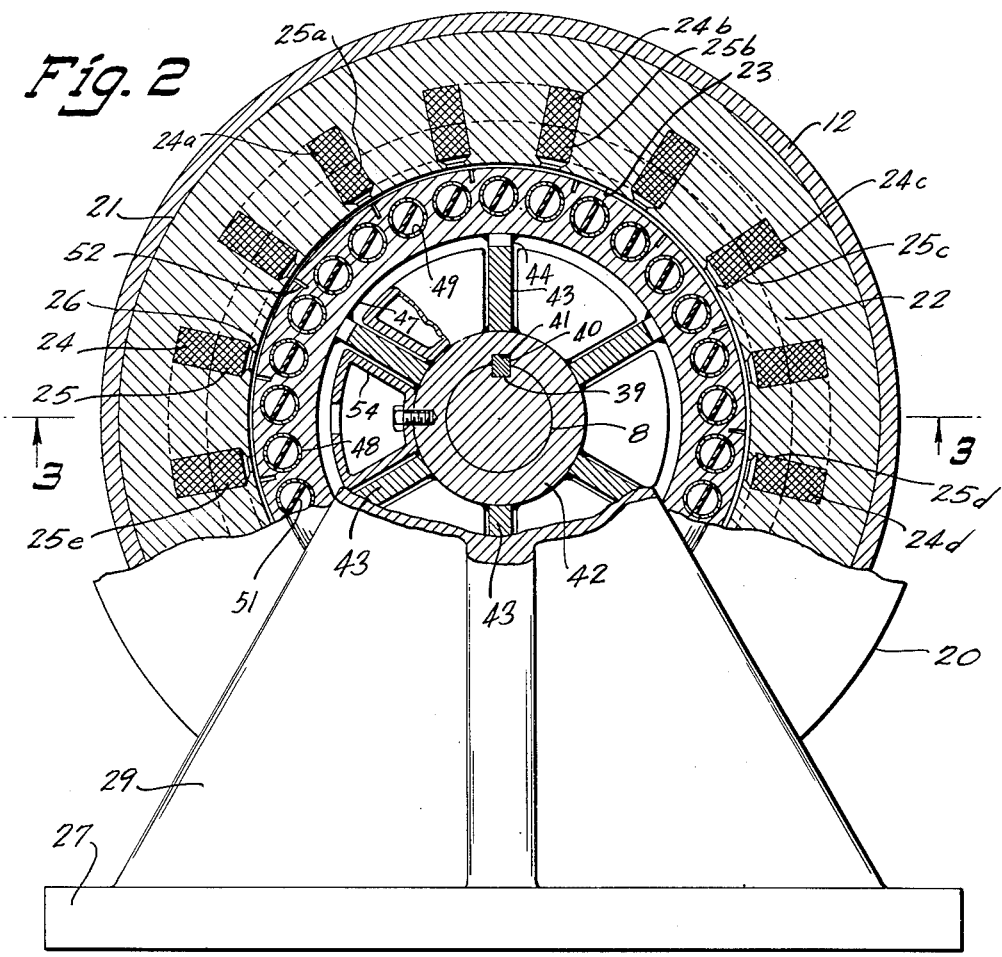
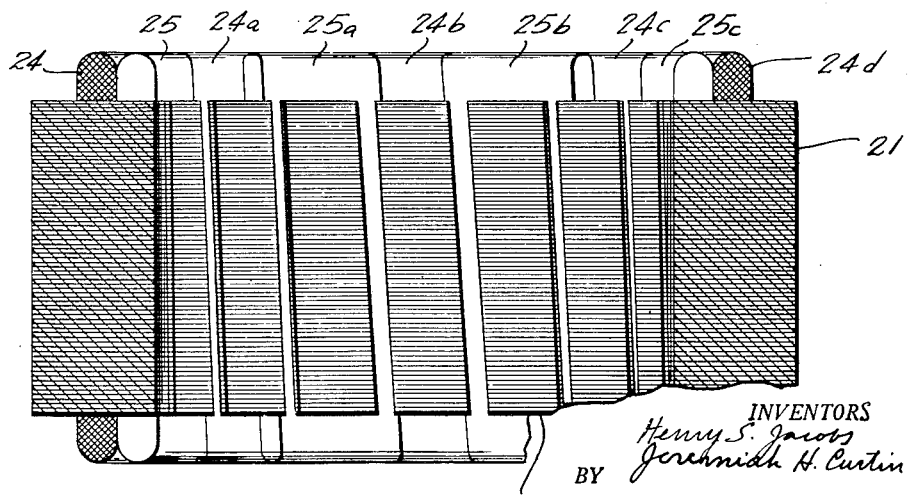

INVENTORS
Henry S. Jacobs
Jeremiah M. Curtin
BY David G. Fox
Attorney

Dec. 4, 1956     H. S. JACOBS ET AL     2,773,202
INDUCED CURRENT TORQUE TRANSMITTER

Filed Feb. 11, 1952     4 Sheets-Sheet 4

INVENTORS
Henry S. Jacobs
Jeremiah H. Curtin
BY
David A. Fox
Attorney

United States Patent Office 2,773,202
Patented Dec. 4, 1956

2,773,202

INDUCED CURRENT TORQUE TRANSMITTER

Henry S. Jacobs, Shorewood, and Jeremiah M. Curtin, Milwaukee, Wis., assignors to Harnischfeger Corporation, Milwaukee, Wis., a corporation of Wisconsin Application February 11, 1952, Serial No. 271,022

10 Claims. (Cl. 310—64)

This invention relates to electro-magnetic torque transmitting apparatus and resides in an improved form of the same wherein electro-magnetic fields common to two relatively rotatable members are caused to sweep through one of the members to establish induced currents therein which result in modifications of the electro-magnetic fields and interact with the same to cause a transmission of torque and in which improved means are provided for removal and dissipation of heat resulting from the current and induced comprising ventilating members of high electrical and thermal conductivity disposed adjacent to or co-incident with the area within which induced current is established.

Heretofore so-called induced current or eddy current brakes and clutches have been constructed in a wide variety of forms. Except in the case of apparatus of this sort which resorts to liquid cooling, which has its own peculiar problems and disadvantages, one of the problems most difficult to cope with has been that of removing heat from the member in which the induced or eddy current is created. Efforts have been made to solve this particular problem by reducing the cross section of the member in which the induced current is established to the minimum permitted by the quantity of flux which is desired to be conveyed. Such a thin drum is then furnished with a multiplicity of closely spaced heat dissipating fins integrally formed with the drum. The number, spacing, and linear extent of the heat dissipating fins can be varied to enhance the rate of removal of heat from the drum but there is an optimum limit in practical design beyond which such measures cannot be carried. As a result even minor overheating of apparatus heretofore employed has produced destructive temperatures in the member within which the induced currents are established.

Through the apparatus of this invention an induced current member is provided which is formed of magnetic material of increased cross-section and there is embedded within this member ventilating ducts composed of material of high heat conductivity, the ducts being so disposed as to closely approach the areas within which the heating effect is most highly concentrated so that heat is rapidly conveyed away from such areas and dissipated by streams of ventilating air passed through the ducts.

The improved induced current member of this invention is preferably employed in conjunction with a field structure capable of exciting the same with flux of high total value rather than high local intensity such as will embrace the relatively large cross section of the induced current member and the ventilating ducts therein to cause the said ducts to serve the double function of providing low resistance electrical conductors as well as heat dissipators. For this purpose it is preferred that an excitation field structure be employed including alternate flanged poles and slots, the same being helically pitched to overlap the spacing of the heat dissipating duct members within the induced current members to minimize torque fluctuations.

It is therefore an object of this invention to provide a torque transmitting apparatus of the character described in which greater capacity may be obtained without the occurrence of destructive temperatures.

The foregoing and other objects and advantages of this invention will appear from the description to follow in which reference is made to the accompanying drawings forming a part hereof and in which there are shown by way of illustration and not of limitation specific forms in which the apparatus of this invention may be embodied.

Figure 5:
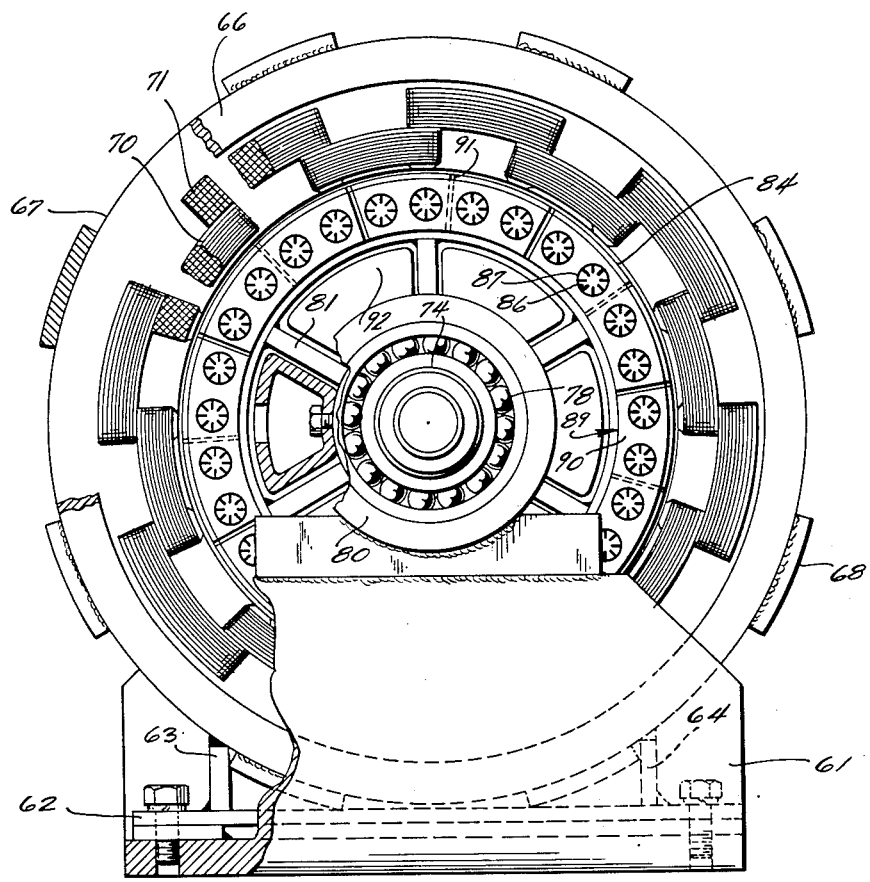
Figure 6:
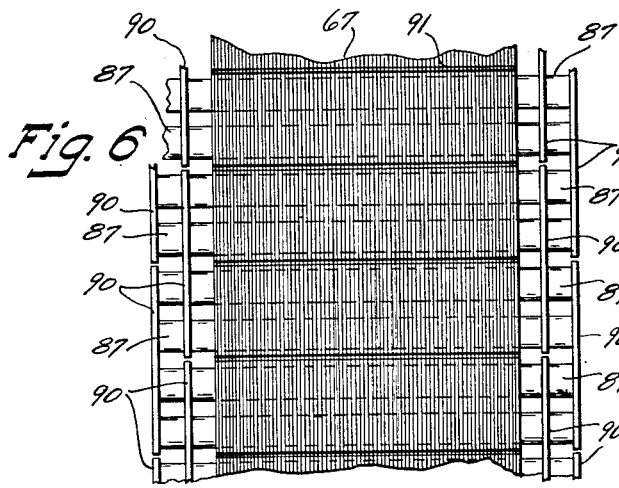
Figure 7:
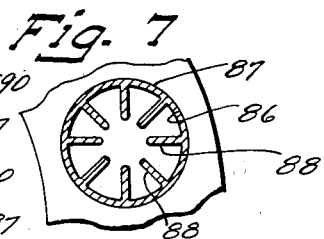

In the drawings:

Fig. 1 is a front view in elevation and in section of one form of electro-magnetic torque transmitting apparatus embodying this invention, Fig. 2 is a side view in elevation of the electro-magnetic torque transmitting apparatus depicted in Fig. 1 partly in section taken on the section line 2—2, Fig. 3 is a bottom plan view in cross section of the windings and magnetic pole pieces only of the electrically excited field member of the electro-magnetic torque transmitting apparatus depicted in Figs. 1 and 2, Fig. 4 is a front view in elevation and in section of another form of electro-magnetic torque transmitting apparatus embodying this invention arranged for use as a brake, Fig. 5 is a side view in elevation of the braking apparatus depicted in Fig. 4 with parts broken away and in section, Fig. 6 is a fragmentary view of the eddy current member of the braking apparatus depicted in Figs. 4 and 5 showing a portion of the cylindrical face of the member projected in a plane, and Fig. 7 is an enlarged fragmentary view in cross section of a cooling fin inserted within a duct in the eddy current member shown in Figs. 4, 5 and 6.

Referring now to the drawings and to the form of the apparatus of this invention set forth in Figs. 1, 2 and 3, a power input shaft 1 is provided which is adapted to be connected to an external source of power not shown. Formed integrally with shaft 1 at the end thereof is a gear 2 mounted in meshed driving relationship to a gear 3 formed as an integral portion of a hollow hub 4. The hub 4 is rotatably carried on a double row ball bearing 5 fitted within the hub 4 and held in position by an internal stop flange 6 formed as a part of hub 4 and a threaded retaining collar 7. Bearing 5, in turn, is borne by a stepped armature shaft 8 which carries the armature mechanism of the apparatus to be described. Integrally merged with and extending radially outward from the inner or right hand side of hub 4 is a circular shroud plate 9 having apertures 10 allowing passage of air therethrough and strengthening ribs 11.

Shroud plate 9 is belled at its outer periphery and flanged to provide a seat to which is bolted a cylindrical housing 12. The opposite side of the housing 12 is bolted to the peripheral flange of a circular shroud plate 13 similar to the shroud plate 9. At the center of plate 13 is a hub 14 in which is fitted a double row ball bearing 15 borne upon the right hand end of stepped shaft 8. Bearing 15 is held in place in the hub 14 by an internal stop flange 16 formed as a part of the hub 14 and a threaded retainer collar 17. Apertures 18 within the shroud plate 13 provide air exit passages. Integrally formed with the shroud plate 13 is a centrifugal blower made up of radial fan blades 19 interposed between the mounting flange of shroud plate 13 and a circular end plate 20 disposed parallel to and to the right of shroud plate 13. The center of the end plate 20 terminates in a conical inner portion sloping toward and merged with the shroud plate 13.

Enclosed within the cylindrical housing 12 and held in position by the clamping action of the shroud plates 9 and 13 is a field piece 21 of laminated magnetic material. An even number of substantially axially extending slots within the laminated field piece 21 form separate pole pieces 22 having flared pole faces 23. In the drawings, for clarity, only one of the several identical pole pieces 22 and pole faces 23 is provided with a designating reference character. Shown more clearly in Fig. 3, a helical pitch is imparted to the pole pieces 22 and pole faces 23 by skewing the laminations which form the field piece 21. Thus, the generally axial direction of the pole pieces 22 and the pole faces 23 is modified by an oblique relationship to the axis of the field piece 21 for reasons hereinafter explained.

Between each of the pole pieces 22 are fitted two windings, that is, one of the outer windings designated 24, 24a, 24b, and 24d and one of the inner windings designated 25, 25a, 25b, 25c, 25d, and 25e. One of the windings in each slot encircles the pole piece to the one side of the slot and other winding encircles the pole piece to the other side of the slot. This is accomplished by the inner windings encompassing alternate pole pieces and the outer windings encompassing the pole pieces therebetween. A wedge 26 is inserted between inner coil 25 and the flaring ends of pole faces 23 to retain the coils in position. The coils are electrically connected to provide magnetic poles of alternate polarity in sequence about the inner circumference of the field member.

A main supporting base 27, carrying vertical uprights 28 and 29, which terminate in bearing seats 30 and 31, housing bearings 32 and 33 provides rotatable support for the armature shaft 8. Bearings 32, 33 are held in the seats 30 and 31 by retaining rings 34, 35. Affixed to the right hand tapered end of shaft 8 by means of a key 36 and a nut 37 is a gear 38 for connection with any apparatus to be driven.

The central portion of the stepped shaft 8 carries an axially extending keyway 39 in which is fitted a key 40 engaged by the keyway 41 in a cylindrical hub 42 encircling the shaft 8. Evenly spaced and projecting radially from hub 42 is a plurality of flat axially extending spokes 43 welded to the hub 42 as shown. The outer extremities of each of the spokes 43 terminate in a set of short abutment feet 44, one at the center of and one at each end of each individual spoke. Positioned radially inward from and near to the abutment feet 44 are apertures 45 disposed so as to form narrow neck portions 46 between the abutment feet 44 and the main body portions of the spokes 43. The necked portions 46 are of such dimension as to maintain the strength required while presenting a small cross-sectional area to retard conduction of heat.

Carried upon the feet 44 and secured thereto by welding is a drum 47 of magnetic material which is rotatable in relation to the field member and which is spaced from the pole faces 23 by a small uniform air gap. Extending through the drum 47 in an axial direction is a plurality of spaced circular openings or ducts 48. Tubular liners 49 of an electrical and heat conducting material such as copper the conductivities of which exceed that of the magnetic material of the drum 47 extend through the openings 48 and contact at their ends short-circuit end rings 50 of copper or other material of high electrical conductivity. Disposed within the liners 49 are helical cooling fins 51 preferably composed of a material of high heat conductivity.

Arranged axially along the outer surface of the drum 47 and recessed into portions thereof which lie between pairs of the openings 48 are a plurality of expansion slots 52. The ends of drum 47 are reduced slightly in diameter by chamfer surfaces 53 extending around the ends of the drum 47 and the end rings 50. The armature structure may be provided with air block filler pieces 54 in the spaces between the hub 42 and the drum 47, which filler pieces are spaced a small distance from the drum 47 and spokes 43 to equalize distribution of the flow of cooling air over the several surfaces to be cooled.

To provide electrical connection to the several rotatable field coils such as 24, 25 circular concentric slip rings 55, 56 are mounted on an insulating ring 57 and a support ring 58 on the shroud plate 9. Contacting the slip rings 55, 56 are stationary contact brushes 59, 60 to which power leads, not shown, are connected.

The field windings such as 24, 25 are connected so as to produce magnetic poles of alternate polarity, thus upon energization of the field windings and rotation of the field piece 21 by application of an input torque to the shaft 1 a magnetic field pattern penetrating the drum 47 will sweep therethrough causing induced currents to occur in the drum and in the copper parts associated therewith. Due to the construction of the field member 21 employing broad pole pieces 22 with flanged faces 23 and the ample windings such as 24, 25 the gross flux penetration of the armature drum 47 will be large without local areas of saturation thus minimizing leakage. Such flux penetration will further embrace the conductive tubular liners 49 and areas encompassing the entire depths of the eddy-current drum 47 to effectively utilize the increased material in which induced currents may be created that is presented by the eddy-current drum of this invention.

With the drum 47 at standstill and the field member 21 being rotated in response to a driving action of the shaft 1 and with an application of energizing current to the windings 24 and 25 the slip frequency of induced currents within the armature drum 47 will be a maximum. The flux penetration within the drum 47 may tend at relatively high slip values to have greater relative concentration near the outer surface of the drum than at low slip and induced eddy-currents may thus predominate near the drum surface for such values of high slip. As slip is decreased and eddy-current frequencies fall in value such appreciable concentrations of induced currents as may exist near the outer surface will subside and a more even distribution of eddy-currents will occur within the drum.

Flux penetration, as previously noted, encompasses the full cross-sectional width of the drum 47 and linkage with the liners 49 provides paths of greater conductivity for induced currents and torque values are thereby enhanced, particularly at low slip frequency.

Slip disappearance of power is converted to heat within the drum 47 and within the conduction liners 49 by reason of the resistance heating effect of currents induced therein. Since the compactness of the apparatus causes this heat to be originated within a small space as well as in restricted portions of the members involved extreme temperature can be avoided only by rapid removal of heat from the locale in which the same originates. To this end a large supply of cooling air is supplied by a centrifugal blower formed of fan blades 19, shroud 13 and flange 20 which rotates in company with the field member 21. The flow of air set up by the blower passes in part through the air gap between pole faces 23 and drum 47, in part along the inner surfaces of drum 47 and the surfaces of the spokes 43, and in part through the axially extending conductor linings 49.

The heat appearing in the conductive liners 49 is dissipated rapidly by connection to the cooling air passing therethrough and this action is enhanced by the fins 51 which present additional surface area to the cooling air stream passing through the liners 49. In the case heating originating within the magnetic material of the drum 47 the condition is somewhat different. This heat must necessarily travel through the relatively poor heat conducting material of the magnetic drum 47 before dissipation may take place. However, in a rotor constructed in accordance with this invention the length of heat paths are short and it is but a small distance from any portion of the drum 47 to an air cooled surface or to the conductive liners 49 and fins 50. Thus, expeditious heat dissipation takes place and the torque slip product of the apparatus may be considerably greater than heretofore, heat dissipation being a major limiting factor with respect to this characteristic.

To insure efficient heat transfer from the drum 47 to the liners 49 and then to the fins 51 a union of high conductivity between the respective elements is employed. Such a union may comprise a fused bond such as a brazed connection or other similar satisfactory means.

In this way the drum 47 is as effectively cooled under conditions of high slip as would be a drum of much smaller radial thickness. Drum surface temperatures are thus held within safe limits. At the same time the drum 47 is provided with sufficient magnetic material to accommodate such deep penetration of flux interlinking the conductive liners 49 as will occur to advantage under conditions of low slip thus permitting higher torque transmission at any given lower slip value.

The cooling effects thus obtained are aided in substantial measure by the air stream which passes axially through the air gap and through the voids at the ends of the slots which accommodate the windings in the field member 21. This is facilitated by chamfering the ends of the drum 47 as appears at 53.

To minimize dimensional changes which would alter the extent of the air gap, cooling is applied to the spokes 43 which join the hub 42 with the drum 47. Flow of heat into the spokes 43 and the hub 42 is minimized further by the limited section of the abutment feet 44 and the reduced sections formed by the apertures 45.

The size and spacing of the conductor linings 49 are of importance. The interruption of current paths within the drum 47 must not be excessive and the restriction of the diameter of the openings must be such as to allow for efficient cooling. For a drum having a radial depth of approximately one-eighth of the diameter of the drum the diameter of the openings 48 preferably should not be less than one-third this radial depth for optimum results.

In those instances wherein the induced eddy-currents are concentrated near the outer surface of the drum 47, as may occur with large slippage, generation of heat will likewise be concentrated near the outer surface. The stresses of thermal expansion become large and are localized under such conditions and to provide relief the slots 52 are circumferentially spaced about the drum surface. A degree of circumferential expansion at the drum surface may then take place to relieve the stresses. Radial expansion is lessened somewhat by the provision of these slots 52. The slots are quite shallow as their use is primarily for the relief of surface conditions and therefore no material effect is made upon the magnetic circuit by the employment of the shallow slots 52.

Figs. 4 through 7 depict another form of this invention in which the apparatus is employed as a brake. A large bracket 61 having upwardly extending end portions has a horizontal base plate 62 mounted therein. Welded to the plate 62 are two flat bars 63 and 64 employed as braces to which the two circular retaining rims 65 and 66 are welded. A laminated field piece 67 of magnetic material similar to the field piece 21 of the apparatus shown in Figs. 1, 2 and 3 is rigidly held between the retaining rims 65 and 66 and a number of cross braces 68 circumferentially spaced about the periphery of the laminated field piece 67 welded to the rims 65 and 66. An even number of substantially axial extending slots form pole pieces such as 69 with flared faces. By skewing the laminations of the field piece 67 a helical pitch is imparted to the pole pieces 69. Windings such as 70 and 71 embrace the pole pieces 69 in a manner similar to the windings of Figs. 1, 2 and 3.

A circular housing 72 belled at its periphery is bolted to the rim 65 to provide an enclosed chamber opening upon the field piece 67 and an armature mounted in rotatable relation thereto. An opening 73 centrally located within the housing 72 provides a passage for an armature shaft 74 and a second opening 75 leads from a blower 76 to provide a flow of air to the enclosed chamber and hence to the elements to be cooled.

Bearings 77 and 78 are supported upon the upwardly extending end portions of the bracket 61 and carry the armature shaft 74 in rotatable manner. Encircling the shaft 74 and held in position by the key 79 is an axial extending hub 80 from which flat radial spokes 81 project. Abutment feet 82 extend from the ends of and from the center of each of the spokes 81 and circular apertures 83 are placed near to and radially inward therefrom. The feet 82 support an armature drum 84 of magnetic material that has champers 85 at the edges of the outer surface to further a flow of cooling air between the poles 69 and the surface of the drum 84.

Circular openings or ducts 86 extend axially through the drum 84 and are circumferentially spaced near the outer surface of the drum 84. Extending through each of the ducts 86 is a liner 87 that protrudes axially beyond the end faces of the drum 84 and within each of the liners 87 is a number of radially extending cooling fins 88 which are integrally joined to the respective liners 87, as is shown in Fig. 7, and each of the fins 88 extends inwardly for a distance somewhat less than the radius of the liners 87.

Joined to the protruding ends of the liners 87 are four segmented end rings 89 each composed of a plurality of circular segments 90. A pair of the end rings 89 is carried by the right hand ends of the liners 87 and the remaining pair is carried similarly by the left hand ends of the liners 87. Each of the individual segments 90 that comprise the end rings 89 spans four of the liners 87. The gaps between the segments 90 of two adjacent end rings 89 at one end of the liners 87 are staggered in the manner shown in Fig. 6. This staggered arrangement permits circumferential expansion due to temperature increases without the occurrence of disruptive stresses while at the same time providing for a continuous electrical end ring path at both ends of the liners 87.

Spaced circumferentially about the surface of the drum 84 is a number of axially extending shallow expansion slots 91. The spacing of the slots 91 with relation to the ducts 85 within the drum 84 is shown in Fig. 6. To complete the structure air block filler pieces 92 are placed between the spokes 81.

Any device to be braked may be connected to the right hand end of the shaft 74. By suitable connection of the windings such as 70, 71 to a power source, not shown, braking torques will be applied to the armature when rotating. As the drum 84 rotates electro-magnetic fields sweep therethrough and induce eddy-currents therein that interact with said fields to give rise to attractive forces acting to retard the armature rotation.

As braking torques are created there is a large generation of heat and the problem of dissipation of this heat is similar to that of the clutch apparatus shown in Figs. 1, 2 and 3. In the instance of a clutch the periods of high slippage are usually confined to short periods of acceleration or deceleration of the driven member. The operating periods of low slippage usually predominate. At the lower slip speeds the induced eddy-currents are of smaller values and heat generation will consequently be less than in an apparatus operated at the higher rates of slippage. A braking apparatus on the other hand finds frequent application wherein the higher rates of slippage are encountered over considerable periods of time. Heat dissipation, in such instances, becomes a more acute problem and the armature shown in Figs. 4 through 7 is constructed to provide for a higher rate of heat dissipation for applications of this nature.

Cooling air forced by the blower 76 to flow across the surfaces of the drum 84 and through the ducts 85 causes a heat transfer to take place. This heat transfer is augmented by the large surface areas presented to the flow of air by the radially extending fins 88 of heat conductive material. Further surface area is presented by the extensions of the liners 87 to either side of the drum 84 to further enhance heat transfer away from the eddy-currents member.

With the increased depth of flux penetration that is possible through the increased drum thickness that is employed in this invention the electrically conductive liners 87 become conductors for considerable eddy-current values. Heat generation therefore takes place to a large degree within the liners 87 and by extending the liners 87 and attendant end rings 89 axially beyond the drum 84 heat generation may be caused to take place outside the confines of the drum itself. Heat dissipation is thus markedly enchanced. The pattern of heat distribution is improved and the temperature rise within the drum 84 is kept within safe limits.

If desired the armature shown in Figs. 4 through 7 may be employed in a clutch mechanism as that of Figs. 1, 2 and 3. Likewise an armature constructed as shown in Figs. 1, 2 and 3 may be employed for braking mechanism. The factors of torque output and heat generation will be determinative in the selection to be made.

We claim:

1. In an electro-magnetic torque transmitting apparatus of the induced current type, the combination comprising a field member adapted to be electrically excited to produce a magnetic flux, an induced current member relatively rotatable with respect to said field member including a hollow circular drum of magnetic material, said circular drum having a plurality of circumferentially spaced axially extending openings open at both ends to permit passage of air therethrough, a lining for each of said axially extending openings extending substantially throughout the same and composed of material having a greater heat conductivity and electrical conductivity than the magnetic material of said drum, and said drum having a plurality of spaced slots extending axially across the outer surface of said drum, said slots being spaced between said axially extending openings to reduced thermally induced stresses in the surface of said drum.

2. In an electro-magnetic torque transmitting apparatus of the induced current type, the combination comprising a field member adapted to be electrically excited to produce a magnetic flux, an induced current member relatively rotatable with respect to said field member including a hollow circular drum of magnetic material, said circular drum having a plurality of circumferentially spaced axially extending tubular openings open at both ends to permit the passage of air therethrough, a tubular lining of substantial thickness for each of said openings extending throughout the same composed of a material having greater heat conductivity and electrical conductivity than the magnetic material of said drum, cooling fins disposed within said tubular linings to enhance dissipation of heat from said induced current member, and said drum having a plurality of spaced slots extending axially across the outer surface thereof to reduce thermally induced stresses in the surface of said drum.

3. In an electro-magnetic torque transmitting apparatus of the induced current type, the combination comprising a field member adapted to be electrically excited to produce a magnetic flux, an induced current member relatively rotatable with respect to said field member including a hollow circular drum of magnetic material, an axial hub centrally disposed within and concentric with said drum of a length substantially as great as that of said drum, a plurality of radial spokes supported by said hub of an axial length substantially the same as that of said drum, abutment feet in supporting relationship to said drum integrally merged with and projecting radially outward from the outer edges of said spokes, said abutment feet having a total axial length of less than one-half that of said spokes, and said spokes having a plurality of apertures one of each being disposed radially inward from and near to one of said abutment feet to provide small cross-sectional area portions between said abutment feet and the major body portions of said spokes.

4. In an electro-magnetic torque transmitting apparatus of the induced current type, the combination comprising a field member adapted to be electrically excited to produce a magnetic flux, an induced current member relatively rotatable with respect to said field member including a hollow circular drum of magnetic material, an axial hub centrally disposed within said drum, a plurality of radial spokes projecting from said hub each having an outer edge in supporting relationship to said drum of axial length substantially the same as that of said drum, and said spokes being cut away near the radially outer margins thereof to form supporting portions of reduced cross sectional area interposed between said drum and the major body areas of said spokes and also having a plurality of apertures each disposed near to and radially inwardly of one of said supporting portions.

5. In an electro-magnetic torque transmitting apparatus of the induced current type, the combination comprising a field member adapted to be electrically excited to produce a magnetic flux, an induced current member relatively rotatable with respect to said field member including a hollow circular drum of magnetic material having a plurality of circumferentially spaced axially extending openings open at both ends to permit passage of air therethrough, a lining of substantial thickness for each of said axial openings extending throughout the same and composed of material having greater heat conductivity and greater electrical conductivity than the magnetic material of said drum, short circuiting end rings disposed in electrical connection with said linings, blower means associated with said field member and said induced current member to cause a flow of cooling air to pass over the surfaces of said induced current member, a hub centrally disposed within said drum, a plurality of spokes projecting from said hub of axial length substantially the same as that of said drum, said spokes projecting from said hub of axial length substantially the same as that of said drum, said spokes having abutment feet contacting and in supporting relationship to said drum integrally merged with and projecting radially outward from the outer edges of said spokes, and said spokes having a plurality of apertures each of which is disposed radially inward from and near to one of said feet to provide small cross-sectional area portions to impede heat transfer to the major body areas of said spokes.

6. In an electro-magnetic torque transmitting apparatus of the induced current type, the combination comprising a circular field member having an even number of radially elongated slots therein dividing the same into an even number of pole pieces, a pair of windings having radially offset winding sides in each of and together occupying substantially the whole of said slots, one of said windings encircling the pole on one side of said slot and the other of said windings encircling the pole on the opposite side of said slot, and said windings being connected to magnetize said poles with opposite polarity in sequence around the circumference of said field member when said windings are excited.

7. In an electro-magnetic torque transmitting apparatus of the induced current type, the combination comprising a circular field member having an even number of radially elongated slots therein dividing the same into an even number of pole pieces, a pair of windings having radially offset winding sides in each of said slots, one of said windings comprising a coil with multiple turns encircling the pole on one side of said slot and the other of said windings comprising a coil with multiple turns encircling the pole on the opposite side of said slot, said windings being connected to magnetize said poles with opposite polarity in sequence around the circumference of said field member when said windings are excited, and a hollow circular drum of magnetic material mounted within and in relatively rotatable relation with said circular field member, said drum having a plurality of spaced slots extending axially across the outer surface thereof.

8. In an electro-magnetic torque transmitting apparatus of the induced current type, the combination comprising a circular field member having an even number of radial slots therein dividing the same into an even number of pole pieces, a pair of windings in each of said slots, one of said windings embracing the pole on one side of said slot and the other of said windings embracing the pole on the opposite side of said slot, said windings being connected to magnetize said poles with opposite polarity in sequence around the circumference of said field member when electrically excited, a hollow circular drum of magnetic material mounted relatively rotatable with respect to said field frame having a plurality of circumferentially spaced axially extending openings open at both ends to permit passage of air therethrough, a lining of substantial thickness for each of said openings extending throughout the same and composed of material having greater heat conductivity and electrical conductivity than the magnetic material of said drum, an axial hub centrally disposed within said drum, and a plurality of spokes projecting from said hub in supporting relationship to said drum having small cross-sectional area portions near said drum to impede heat transfer from said drum to said spokes.

9. In an electro-magnetic torque transmitting apparatus of the induced current type, the combination comprising a field member adapted to be electrically excited to produce a magnetic flux, an induced current member relatively rotatable with respect to said field member including a hollow circular drum of magnetic material having a plurality of axially extending openings open at both ends to permit passage of air therethrough, linings for said openings each extending substantially throughout an opening and protruding axially beyond said drum composed of a material having greater heat conductivity and electrical conductivity than the material of said drum, said linings being joined to one another at either side of said drum by connections axially spaced from said drum, and said drum having a plurality of shallow circumferentially spaced slots extending across the outer surface thereof disposed between said axially extending openings to reduce thermally induced stresses in the surface of said drum.

10. In an electro-magnetic torque transmitting apparatus of the induced current type, the combination comprising a field member adapted to be electrically excited to produce a magnetic flux, an induced current member relatively rotatable with respect to said field member including a hollow circular drum of magnetic material having a plurality of axially extending openings open at both ends to permit passage of air therethrough, linings for said openings each extending substantially throughout an opening and protruding axially beyond said drum composed of a material having greater heat conductivity and electrical conductivity than the material of said drum, said linings being joined to one another at either side of said drum by connections axially spaced from said drum, a plurality of cooling fins disposed within each of said openings merged with and extending inwardly from said linings, and said drum having a plurality of spaced slots extending axially across the outer surface thereof disposed between said axially extending openings to reduce thermally induced stresses in the surface of said drum.

References Cited in the file of this patent

UNITED STATES PATENTS

| | | |
|---|---|---|
| 616,979 | Von Siemens | Jan. 3, 1899 |
| 680,597 | Joel | Aug. 13, 1901 |
| 784,807 | Reist | Mar. 14, 1905 |
| 920,798 | Wiard | May 4, 1909 |
| 1,183,548 | Forbes | May 16, 1916 |
| 1,329,247 | Kuyser | Jan. 27, 1920 |
| 1,337,732 | Stoller | Apr. 20, 1920 |
| 1,963,642 | Beauchamp | June 19, 1934 |
| 2,012,698 | Terrill | Aug. 27, 1935 |
| 2,177,563 | Gartner | Oct. 24, 1939 |
| 2,188,398 | Bernard | Jan. 30, 1940 |
| 2,525,455 | Merrill | Oct. 10, 1950 |
| 2,683,232 | Weissheimer | July 6, 1954 |

FOREIGN PATENTS

| | | |
|---|---|---|
| 793,410 | France | Nov. 16, 1935 |
| 206,072 | Germany | Jan. 25, 1909 |
| 298,695 | Germany | June 22, 1917 |
| 552,428 | Germany | June 15, 1932 |
| 165,945 | Switzerland | Feb. 16, 1934 |